(12) United States Patent
Thiagarajan et al.

(10) Patent No.: US 7,992,361 B2
(45) Date of Patent: Aug. 9, 2011

(54) POLYMER PANELS AND METHODS OF MAKING THE SAME

(75) Inventors: Chinniah Thiagarajan, Karnataka (IN); Frans Adriaansen, Noord Brabant (NL); Jyotiba Baburao Suryawanshi, Bangalore (IN); Ganesh Chandan Gangadharan, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 666 days.

(21) Appl. No.: 11/403,590

(22) Filed: Apr. 13, 2006

(65) Prior Publication Data

US 2007/0251166 A1 Nov. 1, 2007

(51) Int. Cl.
*E04C 2/54* (2006.01)

(52) U.S. Cl. ............. 52/783.1; 52/306; 52/307; 52/308; 47/17

(58) Field of Classification Search .................... 52/200, 52/306–308, 783.1, 783.11, 783.14; 47/17; 359/619, 620, 621, 622, 623, 742, 595, 596, 359/593

See application file for complete search history.

(56) References Cited

U.S. PATENT DOCUMENTS

| | | | | |
|---|---|---|---|---|
| 2,179,863 A * | 11/1939 | Rolph | ............................ | 359/593 |
| 2,714,816 A * | 8/1955 | Pennell | ........................ | 359/592 |
| 2,812,691 A * | 11/1957 | Boyd | ............................. | 359/593 |
| 2,844,998 A * | 7/1958 | Vincent | .......................... | 359/593 |
| 2,858,734 A * | 11/1958 | Boyd | ............................. | 359/593 |
| 3,096,684 A * | 7/1963 | Warnke et al. | ................. | 359/593 |
| 3,274,315 A * | 9/1966 | Kawamura | ..................... | 264/563 |
| 4,235,658 A * | 11/1980 | Klingel et al. | ........... | 156/244.12 |
| 4,519,675 A * | 5/1985 | Bar-Yonah | ..................... | 359/595 |
| 4,576,850 A * | 3/1986 | Martens | ......................... | 428/156 |
| 4,586,297 A | 5/1986 | Tagiasco | | |
| 4,671,025 A | 6/1987 | Butler | | |
| 4,753,054 A | 6/1988 | Butler | | |
| 5,052,164 A * | 10/1991 | Sandow | ...................... | 52/786.13 |
| 5,104,732 A | 4/1992 | Patel | | |
| 5,261,184 A * | 11/1993 | Appeldorn et al. | ............... | 47/17 |
| 5,658,644 A * | 8/1997 | Ho et al. | ......................... | 428/188 |
| 5,870,233 A | 2/1999 | Benz et al. | | |
| 6,191,890 B1 | 2/2001 | Baets et al. | | |
| 6,377,406 B1 | 4/2002 | Hoffmann | | |

(Continued)

FOREIGN PATENT DOCUMENTS

DE 2722817 A1 11/1978

(Continued)

OTHER PUBLICATIONS

Geissler, Matthias, et al., "Patterning: Principles and Some New Developments"; Adv. Mater. 2004, 16, No. 15, Aug. 4, 1249-1269.

(Continued)

*Primary Examiner* — Brian E Glessner
*Assistant Examiner* — James J Buckle, Jr.
(74) *Attorney, Agent, or Firm* — Cantor Colburn LLP

(57) ABSTRACT

Disclosed herein are multiwall panels comprising microscale surface features and methods of making the same. In one embodiment, a multiwall panel is disclosed. The multiwall panel comprises, a top sheet, a bottom sheet, a rib disposed between and connected to the top sheet and the bottom sheet, and a micro-scale surface feature disposed on a surface of the multiwall panel, wherein the micro-scale surface feature comprises a width measured at a base of the surface feature, wherein the width is about 30 micrometers to about 3 millimeters. In another embodiment, a process of forming multiwall panels is disclosed. In yet another embodiment, a naturally lit structure is disclosed.

20 Claims, 6 Drawing Sheets

U.S. PATENT DOCUMENTS

| | | | |
|---|---|---|---|
| 6,898,902 | B1 | 5/2005 | Stoffers et al. |
| 6,908,202 | B2 * | 6/2005 | Graf et al. ........................ 362/26 |
| 6,959,519 | B2 * | 11/2005 | Adriaansen ...................... 52/537 |
| 2002/0197449 | A1 * | 12/2002 | Mende et al. .................. 428/166 |
| 2003/0066638 | A1 | 4/2003 | Qu et al. |
| 2003/0108716 | A1 | 6/2003 | Nun et al. |
| 2003/0207082 | A1 | 11/2003 | Maas et al. |
| 2003/0214070 | A1 | 11/2003 | Goossens et al. |
| 2003/0233796 | A1 * | 12/2003 | Walz et al. ....................... 52/200 |
| 2004/0159054 | A1 * | 8/2004 | Adriaansen et al. ............ 52/81.1 |
| 2004/0177582 | A1 | 9/2004 | Adriaansen |
| 2004/0191485 | A1 * | 9/2004 | Groothues et al. ............. 428/166 |
| 2004/0257659 | A1 * | 12/2004 | Watanabe ...................... 359/619 |
| 2005/0112331 | A1 * | 5/2005 | Donea et al. .................. 428/166 |
| 2007/0240370 | A1 | 10/2007 | Thiagarajan et al. |

FOREIGN PATENT DOCUMENTS

| | | |
|---|---|---|
| DE | 102004032357 A1 | 2/2006 |
| EP | 0150534 A2 | 8/1985 |
| WO | WO 99/41861 A1 | 8/1999 |
| WO | WO 01/13704 A1 | 3/2001 |
| WO | 2005066552 A1 | 7/2005 |

OTHER PUBLICATIONS

Xia, Younan, et al., "Soft Lithography", Angew. Chem. Int. Ed. 1998, 37, 550-575.

International Search Report; International Application No. PCT/US2007/082543; International Filing Date Oct. 25, 2007; Date of Mailing Feb. 27, 2008, 6 pages.

Written Opinion of the International Searching Authority; International Application No. PCT/US2007/082543; International Filing Date Oct. 25, 2007; Date of Mailing Feb. 27, 2008; 6 pages.

German Patent No. 102004032357; Publication Date: Feb. 9, 2006; Abstract Only; 1 page.

Leonid I. Goray et al.; "Efficiencies of Master, Replica, and Multilayer Gratings for the Soft-X-Ray-Extreme-Ultraviolet Range: Modeling Based on the Modified Integral Method and Comparisons with Measurements"; Applied Optics, vol. 41, (2002) No. 7; pp. 4134-1445.

* cited by examiner

POLYMER PANELS AND METHODS OF MAKING THE SAME

TECHNICAL FIELD

The present disclosure relates generally to multiwall panels, and more specifically to multiwall panels comprising surface features.

BACKGROUND

In the construction of naturally lit structures, such as greenhouses, pool enclosures, and sunrooms, glass panel roofs have been employed to allow natural light to shine therein. The glass panels themselves can be mounted in frame-like enclosures that are capable of securing the glass panels and providing a watertight seal. These frame-like enclosures provide for a modular glass roofing system that can be assembled together to form the roof.

Glass panel roofing systems generally provide good light transmission and versatility. However, the cost and maintenance of these systems limits their application and is detrimental to their market acceptance. The initial expenses associated with glass panel roofing systems are the cost of the glass panels themselves as well as the cost of the structures that are employed to support the high weight of the glass. After the initial expenses, the poor insulating ability of these systems and their susceptibility to damage result in high operating and maintenance expenses. This is especially the case in the horticultural industry wherein greenhouse profit margins can be substantially decreased due to these expenditures.

As a result, polymeric panels having multiwall designs have been produced that offer improved impact resistance and improved insulation over glass panel systems. These benefits can provide reduced operational and maintenance expenses. However, the light transmission of polymeric multiwall panels is lower than that of glass, which can reduce a greenhouses overall crop yield. For example, although not bound by theory, it has been estimated that about a 1% increase in overall light transmission can result in about a 5% increase in crop yield. Therefore, for commercial greenhouses, improving the light transmission of roofing materials is very desirable.

Therefore, there is a need for polymeric multiwall panels that can offer improved properties over those previously available.

BRIEF SUMMARY

Disclosed herein are multiwall panels and methods of making the same.

In one embodiment, a multiwall panel is disclosed. The multiwall panel comprises, a top sheet, a bottom sheet, and a rib disposed between and connected to the top sheet and the bottom sheet. The multiwall panel also comprises micro-scale surface features disposed on a surface of the multiwall panel, wherein the micro-scale surface features comprise a width measured at a base of the micro-scale surface features that is about 30 micrometers to about 3 millimeters, and wherein the multiwall panel comprises an average light transmission of greater than or equal to about 70% as measured by ASTM D-1003-00, wherein the light transmission is measured from incidence angles from about −80° to about 80° in about 10° increments.

In one embodiment, a method of forming a multiwall panel is disclosed. The method comprises converting a polymer into a polymer melt, extruding the polymer melt into a multiwall panel, and forming micro-scale surface features on a surface of the multiwall panel, wherein the micro-scale surface features comprise a width measured at a base of the micro-scale surface features that is about 30 micrometers to about 3 millimeters.

In one embodiment, a method of forming a multiwall panel is disclosed. The method comprises, forming a top sheet, forming a micro-scale surface features on the top sheet, forming a bottom sheet, forming ribs, and assembling the top sheet, bottom sheet, and ribs into a multiwall panel. Wherein the micro-scale surface features comprise a width measured at a base of the surface feature that is about 30 micrometers to about 3 millimeters, and wherein the micro-scale surface features are formed using injection molding processes, solvent-assisted micro-molding processes, micro-transfer processes, molten polymer deposition processes, replica molding processes, lithographic processes, a self-assembly processes, or laser engraving processes, as well as combinations comprising at least one of the foregoing processes.

In another embodiment, a naturally lit structure is disclosed. The naturally lit structure comprises, a roof, a structure capable of supporting the roof, multiwall panels disposed on the roof, wherein the multiwall panels comprise at least one micro-scale surface feature disposed on a surface of the multiwall panel, wherein the micro-scale surface feature comprises a width measured at a base of the surface feature, wherein the width is about 30 micrometers to about 3 millimeters.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Disclosed herein are polymeric multiwall panels that offer improved properties over those previously available. To be more specific, multiwall panels are disclosed herein that comprise micro-scale optical features that are employed on a surface of the panel. These micro-scale surface features allow for the production of panels that comprise lower weight than previous designs while offering similar or improved overall light transmission. In addition to these improvements, several manufacturing methods for producing these improved multiwall panels are also disclosed.

At the outset, unless defined otherwise, technical and scientific terms used herein have the same meaning as is commonly understood by one of skill in the art to which this invention belongs. The terms "first", "second", and "the like", as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., "the colorant(s)", includes one or more colorants). Furthermore, as used herein, "combination" is inclusive of blends, mixtures, alloys, reaction products, and the like.

Polymeric multiwall panels are disclosed herein with references to individual figures. One of skill in the art will easily recognize that many of the components of each of the embodiments are similar to or identical to each other. These various components can be added or omitted based on various design choices. As such, various elements and/or features can be introduced in a given figure with the understanding that the polymeric multiwall panels can be modified, as taught herein, to include features illustrated in other embodiments. Each of these elements is first introduced in the discussion of a given figure but is not repeated for each embodiment. Rather, distinct structure is discussed relative to each figure/embodiment.

Figure 1:
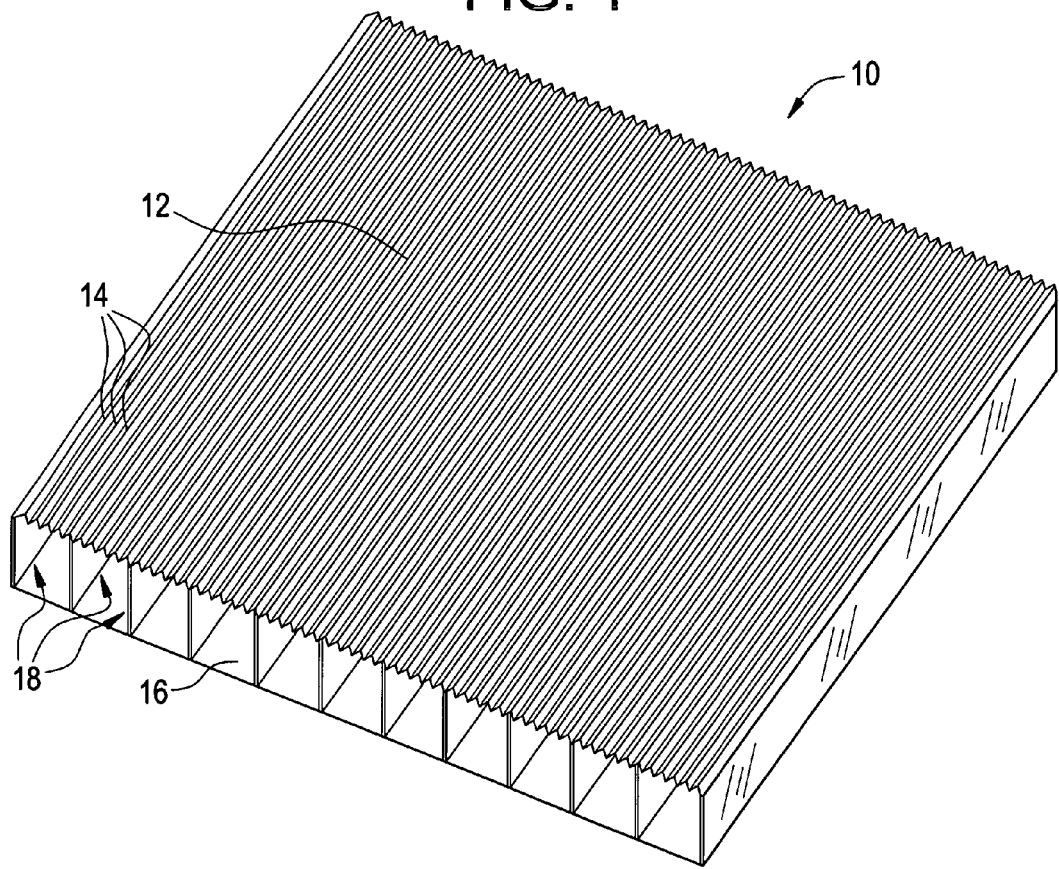
FIG. 1 is an oblique view of an exemplary multiwall panel.

Referring now to FIG. 1, an oblique view of an exemplary multiwall panel, generally designated 10, is illustrated. In the illustration, the multiwall panel 10 comprises a multiwall design, comprising a top sheet 12, bottom sheet 16, and ribs 18 that are connected therebetween. Disposed on the top sheet 12 are a multitude of longitudinal surface features 14 that are capable of directing light, diffusing light, polarizing light, as well as combinations comprising at least one of the foregoing.

Figure 2:
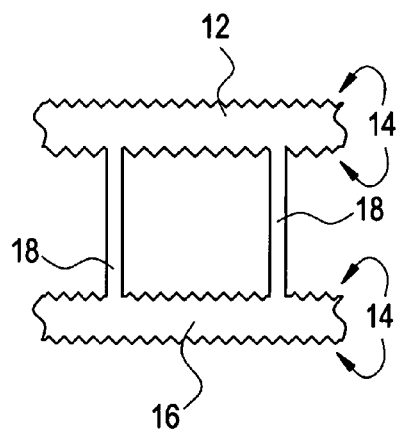
FIG. 2 is a partial and cross-sectional illustration of an exemplary multiwall panel.

The longitudinal surface features 14 can be disposed on any surface of the multiwall panel 10 (hereinafter also referred to as "multiwall panel" or "panel"). For example, referring now to FIG. 2, FIG. 2 is a partial and cross-sectional illustration of an exemplary multiwall panel 10 comprising longitudinal surface features 14 disposed on the top and bottom surfaces of the top sheet 12 and on the top and bottom surfaces of the bottom sheet 16. Although not all possible configurations are illustrated, it is to be understood that optical surface features can be employed on any of the panel's surfaces.

A panel can be formed from polymer processing methods, such as extrusion or injection molding, if produced as a unitary structure. Continuous production methods, such as extrusion, generally offer improved operating efficiencies and greater production rates than non-continuous operations, such as injection molding. In one specific example of a continuous production operation, a single screw extruder is employed to extrude a polycarbonate melt (e.g., Lexan®, commercially available from General Electric Company, GE Plastics, Pittsfield, Mass.). The polycarbonate melt is fed to a profile die that is capable of forming an extrudate having the cross-section of the multiwall panel 10 illustrated in FIG. 1. The multiwall panel 10 travels through a sizing apparatus (e.g., vacuum bath comprising sizing dies) and is then cooled below its glass transition temperature (e.g., about 297° F. (147° C.)).

After the panel has been cooled, it can be cut to length utilizing an extrusion cutter, such as an indexing in-line saw. Once cut, the panel can be subjected to secondary operations prior to packaging. Exemplary secondary operations can comprise: annealing, printing, attachment of fastening members, trimming, further assembly operations, and/or any other desirable processes. The size of the extruder, as measured by the diameter of the extruder's screw, is sized based on the production rate desired and calculated from the volumetric production rate of the extruder and the cross-sectional area of the panel. The cooling apparatus can be sized (e.g., length) to remove heat from the extrudate in an expeditious manner without imparting haze. Haze can be imparted by cooling a polycarbonate extrusion rapidly. Therefore, the cooling apparatus can operate at warmer temperatures (e.g., greater than or equal to about 100° F. (39° C.), or more specifically, greater than or equal to 125° F. (52° C.)), rather than cooler temperatures (e.g., less than 125° F. (52° C.), or more specifically, less than or equal to about 75° F. (24° C.)) to reduce hazing. If warmer temperatures are employed, the bath length can be increased in length to allow ample time to reduce the extrudate's temperature below its glass transition temperature. The size of the extruder, cooling capacity of the cooling apparatus and cutting operation can be capable of producing the multiwall panel 10 at a rate of greater than or equal to about 5 feet per minute (fpm). However, production rates of greater than about 10 fpm, or even greater than about 15 fpm can be achieved if such rates are capable of producing surface features that comprise the desired attributes.

Coextrusion methods can also be employed for the production of the multiwall panel 10. Coextrusion can be employed to supply differing polymers to any portion of the panel's geometry to improve and/or alter the performance of the panel and/or to reduce raw material costs. In one embodiment, a coextrusion process can be employed to reduce raw material costs by supplying a less expensive polymer to non-structural sections, such as foamed or recycled materials for example. In another embodiment, a coextrusion process can be employed to apply a polymer comprising high light transmission (e.g., greater than or equal to about 80%; to be discussed further below) to the longitudinal surface features 14, top sheet 12 and/or bottom sheet 16. Those skilled in the art of coextrusion will comprehend the versatility of the process and the myriad of applications in which it can be employed in the production of multiwall panels.

Figure 3:
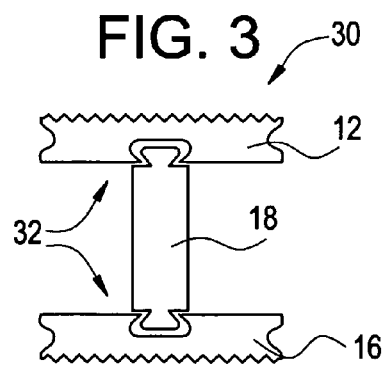
FIG. 3 is a partial and cross-sectional view of a multi-component panel.
Figure 4:
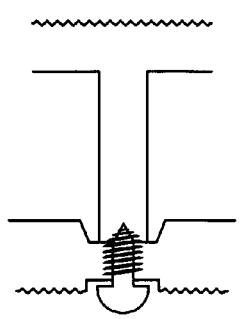
FIG. 4 is a partial and cross-sectional view of exemplary interlocking assembly features.

The multiwall panel 10 can also be constructed from multiple components. In multi-component multiwall panels, the panel can comprise a multitude of components that can be individually formed from differing processes and assembled utilizing a variety of methods. For example, one embodiment of an exemplary multi-component panel is illustrated in FIG. 3. In the illustration, a partial and cross-sectional view of a multi-component panel 30 is illustrated. In the illustration, the multi-component panel 30 comprises a top sheet 12, bottom sheet 16 and ribs 18 that comprise assembly features 32. The assembly features 32 can comprise any shape that allows the multi-component panel 30 to be assembled, such as: buttjoints, lap-joints, hinges, snap-fits, press-fits, inter-locking geometries (e.g., tongue and groove, dovetail), complimentary geometries, and the like, as well as combinations comprising at least one of the foregoing. In another exemplary embodiment, FIG. 4 illustrates a partial and cross-sectional view of exemplary interlocking assembly features 32. In the illustration, a multi-component panel 30 comprises interlocking assembly features 32 that are incorporated into the shape of the top sheet 12, bottom sheet 16 and ribs 18. The interlocking structure improves the stability of the finished product once assembled. In the figure a screw is employed to assemble the bottom sheet 16 onto the ribs 18, which illustrates the use of fasteners. Fasteners, as well as other methods of fastening, can be employed for assembling the panel. Such methods comprise: adhesives (e.g., solvent based bonds, multi-component adhesives, single-component adhesives), fasteners (e.g., screws, bolts, rivets, pins, staples, nails, brads), melt bonding (e.g., hot staking, ultrasonic welding), and so forth, as well as combinations comprising at least one of the foregoing.

A coating(s) can be disposed on any of the panel's surfaces to improve the panel's properties if the coating does not decrease the strength or light transmission of the panel such that the panel is non-operative. Exemplary coatings can comprise antifingal coatings, hydrophobic coatings, hydrophilic coatings, light dispersion coatings, anti-condensation coatings, scratch resistant coatings, and the like.

The ribs 18 can be configured in any manner to provide desirable properties. For example, the rib's length, width, number, orientation, shape, and so forth, can be tailored to alter the strength, insulative ability, light transmission, as well as other variables of the panel. In one example, two ribs 18 can cross at about their centers to form an X-shaped structure.

The longitudinal surface features 14 are capable of directing light into the panel due to their prismatic geometries. The shape of these surface features can comprise any that is capable of directing, diffusing, and/or polarizing light. For example, in addition to the saw tooth-shaped cross-sectional geometries illustrated, the surface features can comprise polygonal forms (e.g., square-wave, trapezoidal, saw-tooth, off-set saw tooth, triangular), curved forms (e.g., sinusoidal, arcing, bumpy, dimpled), irregular forms, and so forth, as well as combinations comprising at least one of the foregoing.

Figure 5:
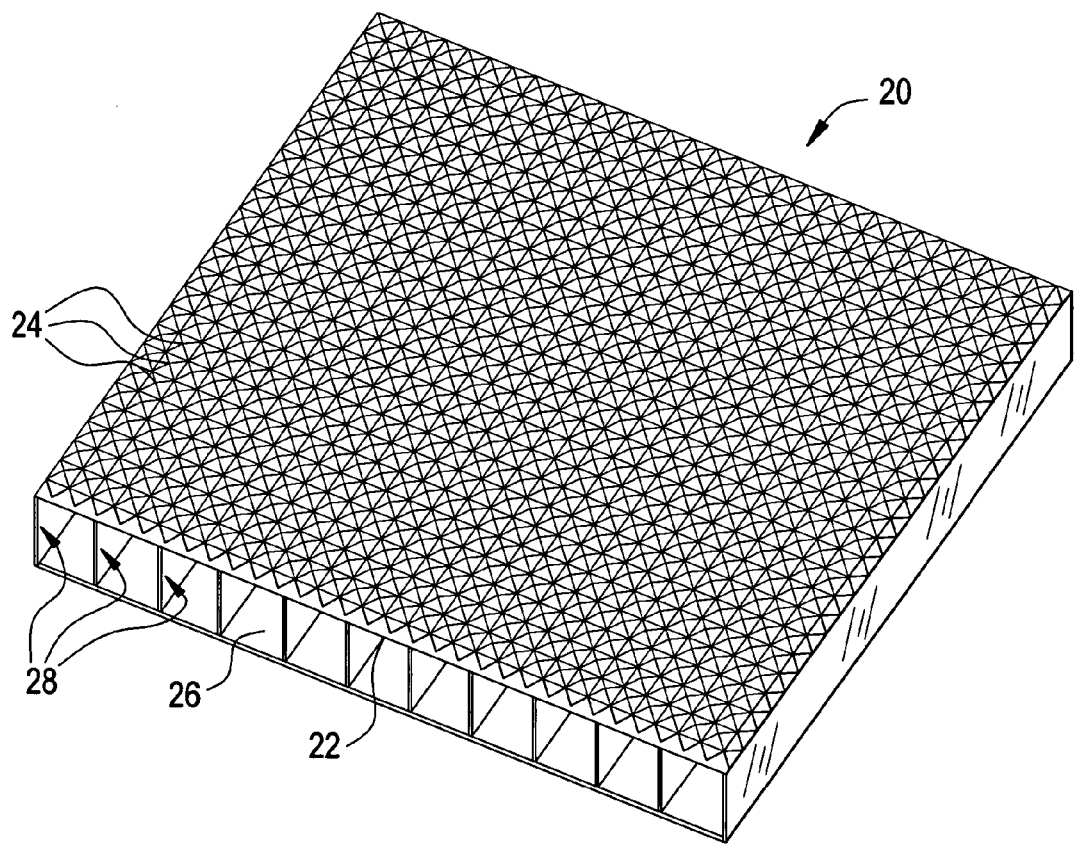
FIG. 5 is an oblique view of an exemplary prismatic panel.

Referring now to FIG. 5, an oblique view of an exemplary prismatic panel, generally designated 20, is illustrated. In the illustration, panel 20 comprises a multiwall design, comprising a top sheet 22, bottom sheet 26, and ribs 28. The top sheet 22 comprises a multitude of pyramidal surface features 24.

The pyramidal surface features 24 are capable of directing light into the panel due to their prismatic geometry. Similar to the longitudinal surface features 14 described above, pyramidal surface features 24 can also comprise any shape that is capable of directing, diffusing, and/or polarizing light. For example, in addition to the pyramidal structures illustrated, the surface features can comprise shapes such as polyhedrons (e.g., any multi-faced three dimensional geometry), rounded shapes (e.g., bumps, dimples, cones), irregular shapes, and so forth, as well as combinations comprising at least one of the foregoing.

Figure 6:
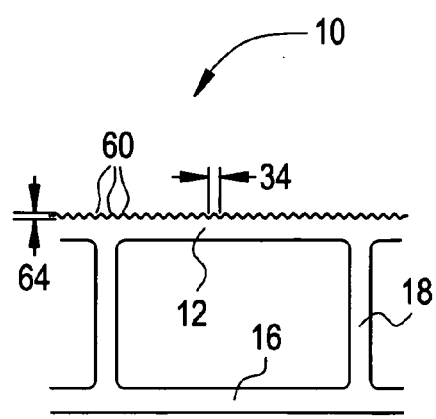
FIG. 6 is a partial and cross-sectional view of a multiwall panel.

The surface features described herein (e.g., longitudinal surface features 14, pyramidal surface features 24) are defined as being micro-scale surface features. More specifically, micro-scale surface features are hereby defined as any optical surface feature comprising a width, measured across the surface feature's base, which is about 30 micrometers to about 3 millimeters in length. Referring now to FIG. 6, a partial and cross-sectional view of the multiwall panel 10 is illustrated. In the illustration, the multiwall panel 10 comprises micro-scale surface features 60 (e.g., longitudinal surface features 14) that are disposed on the top sheet 12 of the panel. The micro-scale surface features 60 comprise a base width 34 and a height 64.

During use, micro-scale surface features 60 are capable of recapturing light, that is reflected off their structure. This enables multiwall panels comprising micro-scale surface features 60 to provide improved light transmission as an increased amount of light is directed through the panel. To be more specific, referring now to FIG. 7, a partial and cross-sectional view of an exemplary micro-feature panel 100 is illustrated. In the illustration, the micro-feature panel 100 comprises a top sheet 102 and a bottom sheet 142 with ribs 104 disposed therebetween. The top sheet 102 has a top surface 106 and a bottom surface 108, which both comprise micro-scale surface feature 60. Similarly, the bottom sheet 142 has a top surface 144 and a bottom surface 146, which both comprise micro-scale surface feature 60. The micro-scale surface features 60 further comprise an internal angle 150. During use, although not limited by theory, incident light 110 is directed at the top surface 106 of the micro-feature panel 100, whereat, a micro-scale surface feature 60 reflects a portion of the incident light 110 as a primary reflection 112 and directs a portion of the incident light 110 into the top sheet 102 as absorbed light 114. The absorbed light 114 is then directed at the bottom surface 108, whereat a micro-scale surface feature 60 reflects a portion of the absorbed light 114 as an absorbed primary reflection 116 and directs a portion of the absorbed light 114 to pass through the bottom surface 108 as transmitted light 118.

The primary reflection 112 is directed at a micro-scale surface feature 60, which reflects a portion of the primary reflection 112 as a secondary reflection 122 and directs a portion of the primary reflection 112 into the top sheet 102 as recaptured light 124. The recaptured light 124 is then directed at the bottom surface 108, whereat a micro-scale surface feature 60 reflects a portion of the recaptured light 124 off of the bottom surface 108 as an absorbed secondary reflection 126 and allows a portion of the recaptured light 124 to pass through bottom surface 108 as secondary transmitted light 128.

The absorbed primary reflection 116 is directed at a micro-scale surface feature 60, which reflects a portion of the absorbed primary reflection 116 as an absorbed secondary reflection 130, and directs a portion of the absorbed primary reflection 116 to pass through the bottom surface 108 as secondary transmitted light 132.

The absorbed secondary reflection 126 is directed at a micro-scale surface feature 60, which reflects a portion of the absorbed secondary reflection 126 as an absorbed tertiary reflection 134 and directs a portion of the absorbed secondary reflection 126 to pass through the bottom surface 108 as tertiary transmitted light 136.

Although not illustrated, the transmitted light (e.g., transmitted light 118, secondary transmitted light 128, secondary transmitted light 132, tertiary transmitted light 136) will be reflected and/or absorbed by the bottom sheet 142, which will be capable of recapturing reflected light via micro-scale surface feature 60 disposed thereon.

Figure 8:
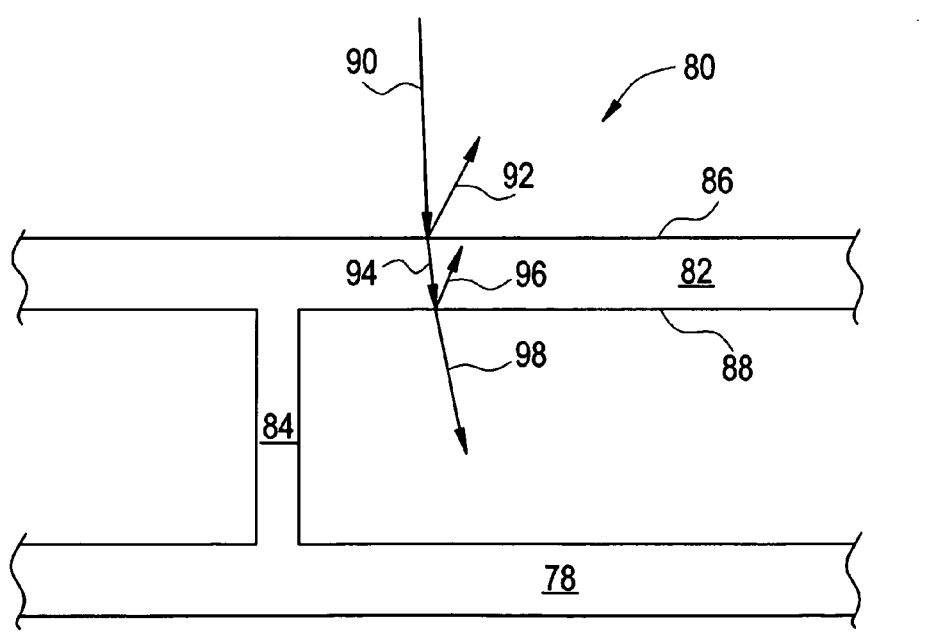
FIG. 8 is a partial and cross-sectional view of an exemplary featureless panel.

Referring now to FIG. 8, a partial and cross-sectional view of an exemplary featureless panel 80, is illustrated. In the illustration, the featureless panel's top sheet 82, bottom sheet 78, and ribs 84 are shown. The top sheet 82 has a top surface 86 and a bottom surface 88. The featureless panel 80 does not comprise surface features. During use, although not limited by theory, the incident light 90 is directed at the top surface 86. A portion of the incident light 90 is reflected off of the top surface 86 as a primary reflection 92, and a portion of the incident light 90 is directed into the top sheet 82 as absorbed light 94. The absorbed light 94 is then directed at the bottom surface 88 wherein a portion of the absorbed light 94 reflects off of the bottom surface 88 as an absorbed primary reflection 96, and a portion of the absorbed light 94 passes through top sheet 82 as transmitted light 98.

Figure 7:
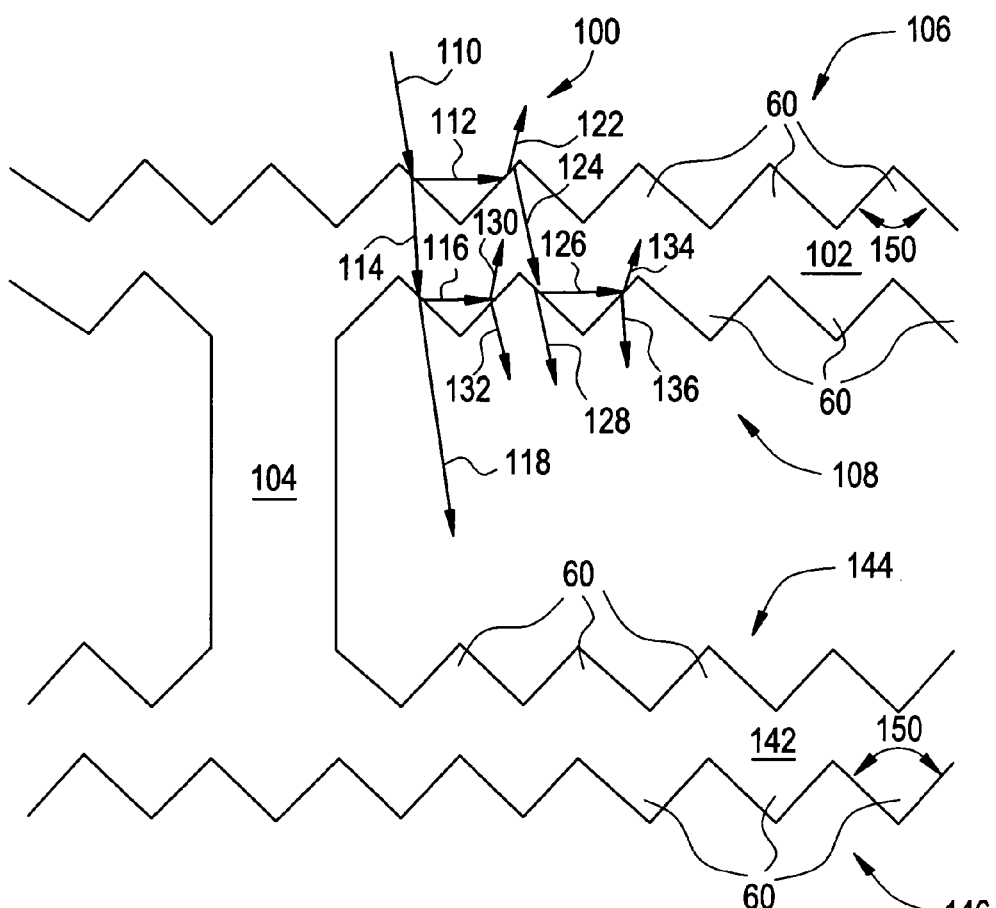
FIG. 7 is a partial and cross-sectional view of an exemplary micro-feature panel.

Comparing FIG. 7 and FIG. 8, the micro-feature panel 100 is capable of recapturing reflected light (e.g., recaptured light 124, secondary transmitted light 132, secondary transmitted light 128, tertiary transmitted light 136), whereas the featureless panel 80 is not capable of recapturing reflected light (primary reflection 92). To be more specific, it is predicted that the micro-feature panel 100 allows about 89.1% total light transmission wherein the featureless panel 80 allows about 81.0% light transmission, although not to be bound by theory. Although an 8.1% increase in light transmission may seem marginal, it has been estimated that approximately a 1% increase in overall light transmission can result in about a 5% increase in crop yield, although not to be bound by theory. Therefore, the multiwall panel 10 disclosed herein can potentially enable an increase in crop yield of greater than or equal to about 40%.

The surface features disclosed herein (e.g., micro-scale surface features 60, longitudinal surface features 14, pyramidal surface features 24) can be geometrically tailored to provide desired properties. Although not limited by theory, natural light can have a wavelength of about 550 nm, and the micro-scale surface features 60 are sized such that at least a portion of reflected light can be directed into the panel. For example, micro-scale surface features can be configured so that the amount of reflected light that is recaptured is tailored for the specific application, for example, to alter the total light transmission through the panel. Some variables that can be tailored are, for example, height, width, shape, and the like. As discussed with reference to FIG. 7 and FIG. 8, these variables can affect prismatic effects, reflections, total light transmission, as well as other variables.

The prismatic panel 20 can be formed using any of the manufacturing methods described in relation to the multiwall panel 10 above. In one embodiment, the prismatic panel 20 can also be produced utilizing components formed from differing processes and then assembled thereafter. For example, referring again to FIG. 5, a profile extrusion process can be employed to produce a profile comprising a bottom sheet 26, a top sheet 22 and ribs 28 that does not comprise prismatic surface features 24. An embossed film that comprises prismatic surface features 24 can then be adhered onto this profile via a curable adhesive to form a prismatic panel 20. In yet another example, the profile extrusion discussed above can be subjected to a forming process that is capable of forming prismatic surface features 24 on the profile's top sheet 22 to form a prismatic panel 20. The forming process can employ methods such as, embossing, calendaring, casting, and so forth. One exemplary embodiment is described below.

Figure 9:
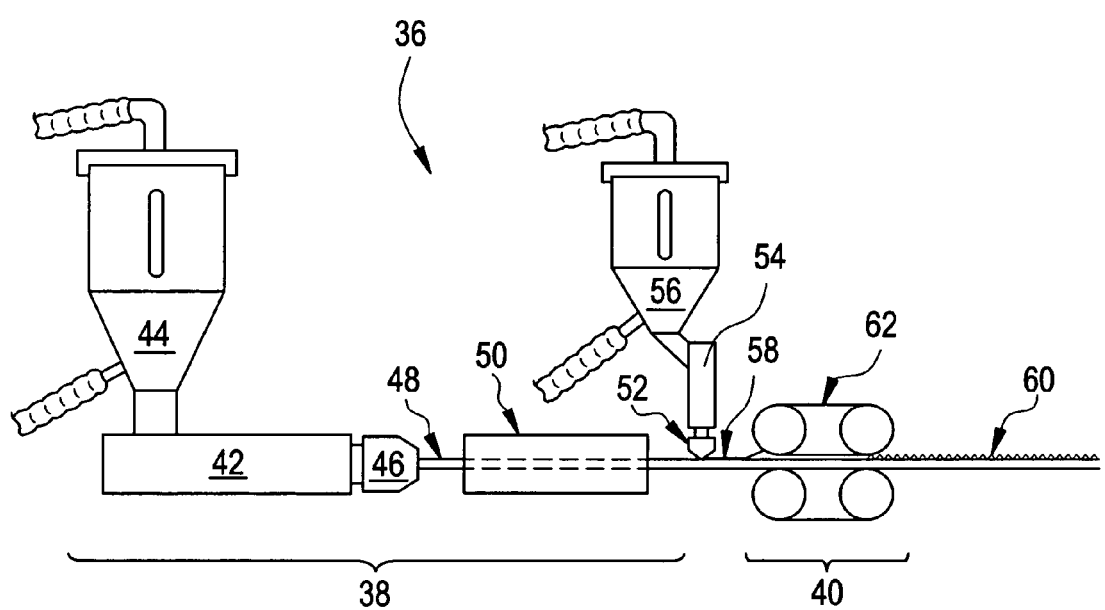
FIG. 9 is a side view of an exemplary panel forming manufacturing line.

Referring now to FIG. 9, a side view of an exemplary panel forming manufacturing line generally referred to as 36, is illustrated. In the illustration, the manufacturing line comprises an extrusion process 38 and a surface feature forming process 40. The extrusion process comprises a primary extruder 42 that is supplied a polymer (not shown) from a hopper/dryer 44. The polymer is melted and conveyed through the extruder 42 and pushed through a profile die 46. The profile die 46 comprises a design that is capable of producing a profile 48. The profile 48 does not comprise any optical surface features in this exemplary embodiment. The profile 48 is fed through a vacuum water bath (50) that is capable of sizing and cooling the profile 48. The profile 48 continues into the surface feature forming process 40, which comprises a hot-melt coating die 52 that disposes a hot-melt 58 onto the top sheet of the profile 48. The hot-melt coating die 52 is fed from a secondary extruder 54 that converts a second polymer (not shown) into the hot-melt 58. The secondary extruder 54 is fed the second polymer by a second hopper/dryer 56. Once the hot-melt 58 is disposed on the profile 48, the hot-melt 58 is formed into micro-scale surface features 60 by embossing belt 62. It is to be understood that the exemplary panel forming manufacturing line 36 can comprise variations of the extrusion process 38 and surface feature forming process 40 illustrated, as well as comprise additional operations, such as, coating, forming, laminating, printing, labeling, annealing, cutting, trimming, assembling, and so forth, as well as combinations comprising at least one of the foregoing.

In an alternative embodiment, a coextrusion process can be employed to form the ribs 28 from a recycled polycarbonate, while the top sheet 22 and bottom sheet 26 can be formed from a virgin polycarbonate (see FIG. 5). The profile 48 produced can then be coated with a curable polymer that is formed into optical surface features by an embossing process. During the embossing process, the curable polymer can be spread evenly across the surface of the top sheet 22, shaped by an embossing belt into prismatic surface features 24 and cured (e.g., heat, light). Once cured, secondary operations can be employed to modify the panel, alter the properties of the panel, further assemble the panel, and so forth. Exemplary secondary operations comprise: fastening operations (e.g., adhesive bonding, solvent bonding, ultrasonic welding, heat staking, stapling, screwing), coating operations (e.g., solvent coating, spray coating, embossing, extrusion coating), annealing, labeling (e.g., printing, adhesive labeling), and so forth, as well as combinations comprising at least one of the foregoing.

In addition to the polymer conversion processes disclosed above for forming surface features on a multiwall panel, additional processes can be employed. For example, injection molding, solvent assisted micro-molding, micro-transfer processes, and/or "ink-jet" type processes (e.g., molten polymer deposition processes), as well as replica molding processes, such as those employed to fabricate holograms or compact disks, can be employed to form surface features. In addition, elastomeric molds and/or stamps can be used as master patterns in forming processes to form surface features.

Alternatively or in conjunction, processes capable of forming a mask can be employed for producing a master pattern (e.g., embossing belt and/or embossing drum), which can be used to form surface features or the mask can be employed to directly form surface features on a substrate (e.g., multiwall panel). For example, lithographic processes can be employed to form surface features on a master pattern or a multiwall panel. One example of such processes can be photolithography processes wherein a master pattern is transferred to a medium that serves as the photoresist (e.g., photosensitive film) via ultraviolet light. Once the desired features are formed in the photoresist, it can be employed as a mask that will allow a media to be applied to the portions of the substrate that are not masked. Alternatively, a maskless lithographic process can be employed, wherein surface features can be formed directly on a photoresist wherein the photoresist is disposed on the substrate using a focused ultraviolet light (e.g., laser). Other examples are stereolithographic methods, such as those that employ photocurable polymers, wherein a three dimensional surface feature can be formed by selectively curing portions of a photocurable polymer using a laser.

Self-assembly processes can also be employed, wherein a surface feature can be formed as compounds and/or molecules disposed on the surface of a substrate organize themselves to achieve a final structure, that is in its lowest free-energy state. Yet further, laser engraving processes can be employed to engrave and/or shape surface features in and/or on a substrate.

The materials employed for the panels disclosed herein can be polymers. More specifically, polymers comprising a transmittance value (per ASTM D-1003-00) of greater than or equal to about 80%. Even more specifically, polymers comprising transmittance greater than or equal to about 85% can be employed. High transmittance is a desirable attribute for the panels discussed herein as it is a measure of the total transmission of light that is capable of passing through an article. More specifically, transmittance is defined as:

$$T\% = (I/I_o) \times 100\%$$

Wherein:
I=intensity of the light passing through the test sample
$I_o$=Intensity of incident light In addition to transmittance, the polymeric materials employed for the panels is to comprise sufficient impact resistance to enable the panels to resist brittle fractures caused by impact (e.g., hail, stones). Polymers comprising impact strength greater than or equal to about 7.5 foot-pounds per square inch, ft-lb/in$^2$ (4.00 joules per square centimeter, J/cm$^2$), or more specifically, greater than about 10.0 ft-lb/in$^2$ (5.34 J/cm$^2$) or even more specifically, greater than or equal to about 12.5 ft-lb/in$^2$ (6.67 J/cm$^2$) are desirable, as tested per ASTM D-256-93 (Izod Notched Impact Test). Further, the polymer employed is to comprise ample stiffness to allow for the production of a panel that can be employed in applications wherein the panel is generally unsupported across its width, such as in greenhouse applications that employ tubular steel frame construction. Sufficient stiffness herein is defined as polymers comprising a Youngs' modulus (e.g., modulus of elasticity) that is greater than or equal to about 200,000 pounds per square inch, psi (14,061 kilograms per centimeter squared, kg/cm$^2$), or more specifically, greater than or equal to about 250,000 psi (17,577 kg/cm$^2$), or even more specifically, greater than or equal to about 300,000 psi (21,092 kg/cm$^2$). Exemplary materials comprise polycarbonate, acrylic, and acrylonitrile-butadiene-styrene. It is also to be understood that the polymeric materials employed can optionally comprise various additives. Exemplary additives comprise: antioxidants, such as, organophosphites, for example, tris(nonyl-phenyl)phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents, UV absorbers, stabilizers such as light stabilizers and others, lubricants, plasticizers, pigments, dyes, colorants, anti-static agents, blowing agents, flame retardants, impact modifiers, among others.

Figure 10:
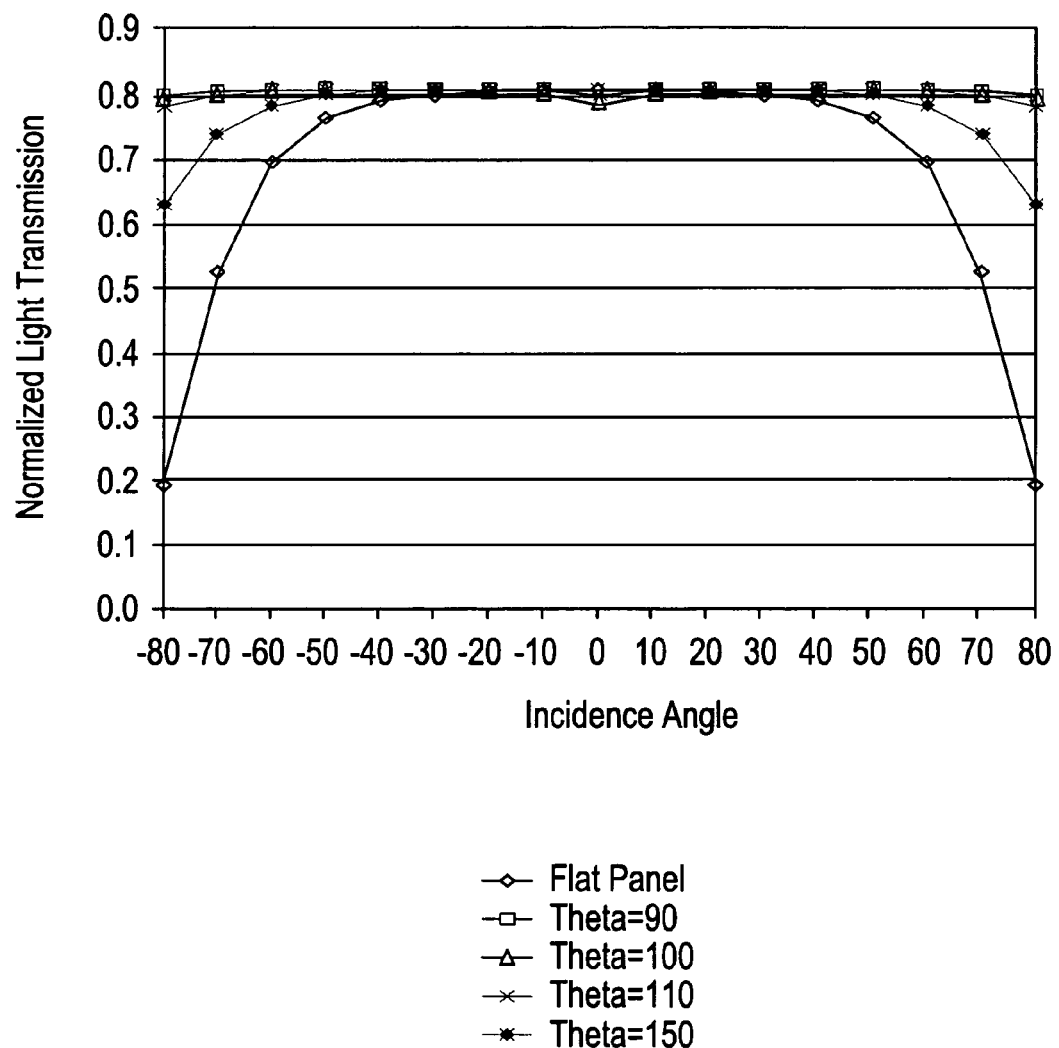
FIG. 10 is a graph illustrating light transmission as a function of incidence angle.

The panels disclosed herein provide several benefits when compared to featureless panels 80 and multiwall panels employing macro-scale optical surface features. Firstly, a micro-feature panel 100 (FIG. 8) comprising micro-scale surface features 60 provides markedly improved light transmission compared to featureless panels 80. Referring now to FIG. 10, a graph illustrating light transmission as a function of incidence angle is presented. More specifically, five multi-layer panels were modeled and evaluated using Zemax optical design and analysis simulation software (Zemax Development Corporation, Bellevue, Wash.) to simulate exposure during the course of a day under ambient lighting conditions using sequential ray tracing parameters. The simulation measured light transmission for each panel at varying incidence angles. Presented on the x-axis, the range of incidence angles was from about −80° to about 80°, taken in 10° increments, wherein a 0° incidence angle simulates a light source disposed perpendicular to the panel (also referred to as direct light), and wherein about −90° and about 90° incidence angles simulates a light source disposed parallel with the sample. On the y-axis, normalized light transmission is presented, wherein the light transmission was normalized with respect to 1.0 for conciseness (i.e., 1.0 is equivalent to 100% of the total incident light, 0.9 is equal to 90% of the total incident light, 0.8 is equal to 80% of the total incident light, and so forth).

The panels modeled and analyzed comprised: a featureless panel 80 (represented as "Theta 0°" in FIG. 10), a micro-feature panel 100 comprising micro-scale surface features 60 having an internal angle of 90° (represented as "Theta 90°" in FIG. 10), a micro-feature panel 100 comprising micro-scale surface features 60 having an internal angle of 100° (represented as "Theta 100°" in FIG. 10), a micro-feature panel 100 comprising micro-scale surface features 60 having an internal angle of 110° (represented as "Theta 110°", in FIG. 10), and a micro-feature panel 100 comprising micro-scale surface features 60 having an internal angle of 150° (represented as "Theta 150°" in FIG. 10).

Comparing the graph of the Theta=0° panel (featureless panel 80) to the graphs of the panels that comprised micro-scale surface features 60 (e.g., Theta=90°, Theta=100°, Theta=110°, and Theta=150°), all of the panels produced comparable light transmission values (e.g., about 0.8) within the range of about −30° to about 30°. However, at incidence angles less than about −30° and greater than about 30°, the featureless panel 80 provided markedly less light transmission than the panels that comprised micro-scale surface features 60.

Comparing the panels that comprised micro-scale surface features 60 to one another, Theta=90°, Theta=100°, Theta=110°, and Theta=150° exhibited comparable light transmission values (e.g., about 0.8) within the range of about −50° and about 50°. However, at incidence angles less than about −50° and greater than about 50°, the Theta=150° panel exhibited less light transmission than the Theta=90°, Theta=100°, and Theta=110° panels.

Comparing the Theta=90°, Theta=100°, and Theta=110° samples, all of the samples exhibited normalized light transmission values that were equal to or greater than about 0.70, or more specifically, equal to or greater than 0.75, or even more specifically, equal to or greater than about 0.80 for the entire range tested (e.g., about −80° to about 80°). Furthermore, it is believed that the data generated by the simulation software will be comparable to empirical results as tested by ASTM D-1003-00.

From these results, it is established that the panels comprising micro-scale surface features 60 produce greater light transmission than the featureless panel 80 at incidence angles about equal to or less than about −30° and about equal to or less than about 30°. In addition, it is established that the internal angle 150 of the micro-scale surface features 60 can affect light transmission. To that end, it is to be apparent that the surface features can be configured in any manner to attain a desired property, for example, the internal angle 150, height, width, pitch, shape, and so forth, as well as combinations comprising at least one of the foregoing, can be tailored to provide a desired light transmission.

Figure 11:
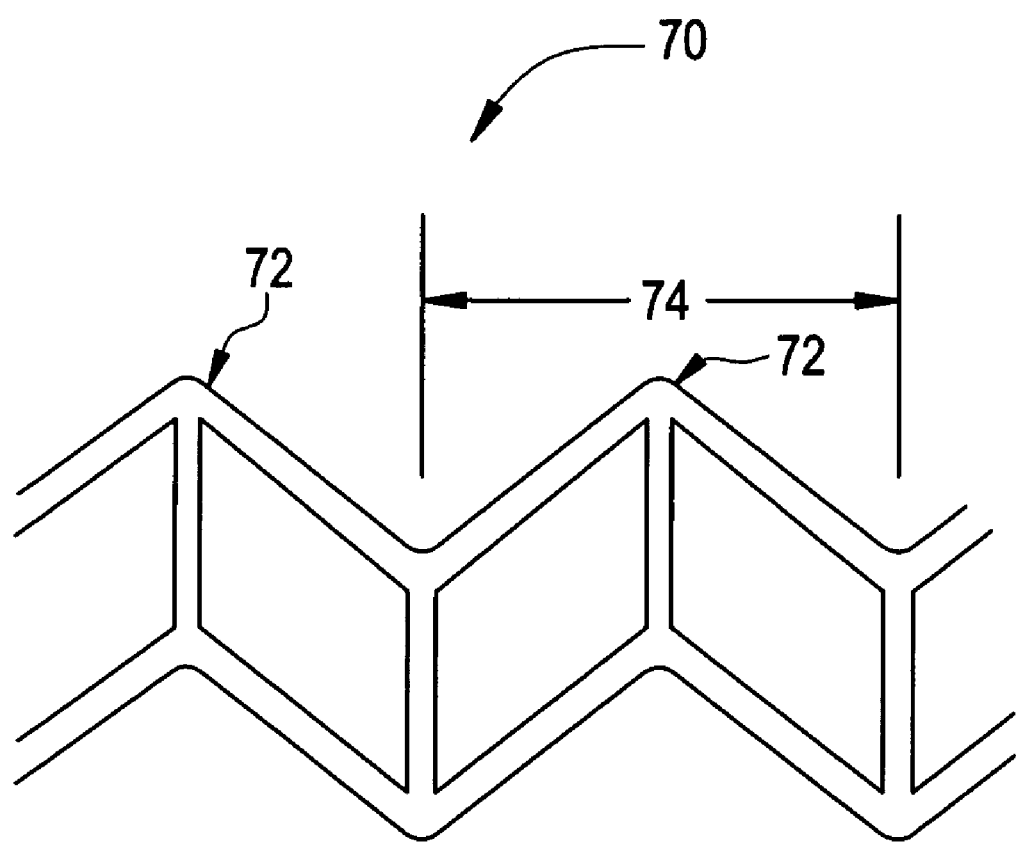
FIG. 11 is a partial and cross-sectional view of a conventional multiwall panel.

In addition to improved light transmission, panels that employ micro-scale surface features 60 also comprise lower weight than panels that comprise macro-scale surface features. For example, referring now to FIG. 11, a partial cross-sectional view of a macro-feature multiwall panel 70 is illustrated. The macro-feature multiwall panel 70 comprises macro-scale features 72, which comprise a width 74 that is greater than or equal to about 50 mm. The macro-feature multiwall panel 70 weighs about 0.819 pounds per square foot, lb/ft$^2$ (4.0 kilograms per square meter, kg/m$^2$). In contrast, the multiwall panel 10 comprises about 0.553 lb/ft$^2$ (2.7 kg/m$^2$), which corresponds to about 30% lower weight than the macro-feature multiwall panel 70.

Micro-scale surface features 60 also allow for the construction of panels comprising improved geometries. To be more specific, because micro-scale surface features 60 are smaller than macro-scale surface features 72, panels can be formed comprising alternative designs than the macro-feature multiwall panel 70 while providing equal to or greater light transmission than the macro-feature multiwall panel 70. Therefore, designers have greater design flexibility that can provide multiwall panels having improved properties, such as, reduced weight, increased light transmission, increased strength, increased insulative properties, and so forth. In one specific example, micro-scale surface feature panels can comprise a design that is more conducive to customized installations and provides less complex weatherproofing than panels comprising macro-features. To be more specific, macro-feature multiwall panel 70, which comprises a "zig-zag" shaped geometry, are assembled to assembly components, that comprise a zig-zag shaped side that attaches to the panel and a generally straight (i.e., not zig-zag shaped) side that attaches to a structure. Because the zig-zag shaped assembly component is specifically used to attach the macro-feature multiwall panel 70, the panel and the assembly component are not conducive to alteration (e.g., cutting a angle in a panel to meet the pitch of an existing roofline). In addition, the complexity of the connection between the two zig-zag shapes can increase the potential for leakage and insufficient weatherproofing. However, multi-wall panels comprising micro-scale surface features can be installed in assembly components that are generally straight, such as a U-channels or L-channels that employ simple gaskets or sealing elements to provide improved weatherproofing. This also allows panels comprising micro-scale surface features to be customizable (e.g., a generally flat panel comprising micro-scale surface features can be cut into a triangular section and a U-channel can be assembled on all of the straight edge of the modified panel). These features can reduce the overall cost of the panel and assembly components, enable systems that are customizable, as well as decrease assembly, maintenance, and replacement costs.

Although specifically discussed with relation to naturally lit structures (e.g., greenhouses, sun-rooms, and pool enclosures), multiwall panels comprising micro-scale surface features can be envisioned as being employed in any application wherein a panel is desired having a multiwall design and improved light transmission. Exemplary applications comprise, sunroofs, canopies, shelters, windows, lighting fixtures, sun-tanning beds, stadium roofing, and so forth.

As discussed herein, multiwall panels comprising micro-scale surface features exhibit improved properties over featureless panels and multiwall panels comprising macro-scale surface features. To be more specific, multiwall panels comprising micro-scale surface features exhibit markedly improved light transmission compared to featureless panels, lower weight than macro-feature panels, as well as offering design flexibility and customizable systems. In addition, employing micro-scale surface features can reduce the overall cost of the panel (e.g., decrease in raw materials costs, decreased weight, simple assembly systems, and so forth), reduce the cost of assembly components and/or systems, and decrease assembly, maintenance, and replacement costs.

While the multiwall panels have been described with reference to exemplary embodiments, it will be understood by those skilled in the art that various changes may be made and equivalents may be substituted for elements thereof without departing from the scope. In addition, many modifications may be made to adapt a particular situation or material to the teachings of the multiwall panels without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multiwall panel, comprising:
   a top sheet comprising a top surface and a bottom surface;
   a bottom sheet comprising a first surface and a second surface;
   a rib disposed between the bottom surface and the first surface;
   wherein micro-scale surface features are disposed on the top surface and the bottom surface and/or on the first surface and the second surface;
   wherein
      if the micro-scale surface features are disposed on the top surface and the bottom surface, the micro-scale surface features disposed on the top surface are parallel to the micro-scale surface features disposed on the bottom surface,
      if the micro-scale surface features are disposed on the first surface and the second surface, the micro-scale surface features disposed on the first surface are parallel to the micro-scale surface features disposed on the second surface, or
      if the micro-scale surface features are disposed on the top surface, the bottom surface, the first surface, and the second surface, the micro-scale surface features disposed on the top surface are parallel to the micro-scale surface features disposed on the bottom surface and/or the micro-scale surface features disposed on the first surface are parallel to the micro-scale surface features disposed on the second surface; and,
   wherein the multiwall panel comprises an average light transmission of greater than or equal to about 70% as measured by ASTM D-1003-00, wherein the light transmission is measured from incidence angles from about −80° to about 80° in about 10° increments.

2. The multiwall panel of claim 1, wherein the micro-scale surface features are selected from the group consisting of being capable of directing, diffusing, polarizing light, and combinations comprising at least one of the foregoing.

3. The multiwall panel of claim 1, wherein the multiwall panel comprises a coating disposed on the top surface, the bottom surface, the first surface, and/or the second surface of the multiwall panel.

4. The multiwall panel of claim 1, wherein the micro-scale surface features are disposed on the top surface, the bottom surface, the first surface, and the second surface.

5. The multiwall panel of claim 1, wherein the micro-scale surface features comprise a width measured at a base of the micro-scale surface features that is about 30 micrometers to about 3 millimeters.

6. The multiwall panel of claim 1, wherein the multiwall panel comprises an average light transmission of greater than or equal to about 80% as measured by ASTM D-1003-00, wherein the light transmission is measured from incidence angles of about −80° to about 80° in about 10° increments.

7. The multiwall panel of claim 1, wherein the micro-scale surface features have an internal angle of 90 to 150 degrees.

8. A method of forming a multiwall panel, comprising:
converting a polymer into a polymer melt;
extruding the polymer melt into a multiwall panel, wherein the multiwall panel comprises a top sheet comprising a top surface and a bottom surface, a bottom sheet comprising a first surface and a second surface, and a rib disposed between the bottom surface and the first surface; and
forming micro-scale surface features on the top surface and the bottom surface and/or on the first surface and the second surface;
wherein
if the micro-scale surface features are disposed on the top surface and the bottom surface, the micro-scale surface features disposed on the top surface are parallel to the micro-scale surface features disposed on the bottom surface,
if the micro-scale surface features are disposed on the first surface and the second surface, the micro-scale surface features disposed on the first surface are parallel to the micro-scale surface features disposed on the second surface, or
if the micro-scale surface features are disposed on the top surface, the bottom surface, the first surface, and the second surface, the micro-scale surface features disposed on the top surface are parallel to the micro-scale surface features disposed on the bottom surface and/or the micro-scale surface features disposed on the first surface are parallel to the micro-scale surface features disposed on the second surface.

9. The method of claim 8, wherein the multiwall panel comprises a coating disposed on a surface of the multiwall panel.

10. The multiwall panel of claim 8, wherein the micro-scale surface features have an internal angle of 90 to 150 degrees.

11. The multiwall panel of claim 8, wherein the micro-scale surface features are disposed on the top surface, the bottom surface, the first surface, and the second surface.

12. A method of forming a multiwall panel, comprising:
forming a top sheet comprising a top surface and a bottom surface;
forming a bottom sheet comprising a first surface and a second surface;
forming micro-scale surface features on the top surface and the bottom surface and/or on the first surface and the second surface;
wherein
if the micro-scale surface features are disposed on the top surface and the bottom surface, the micro-scale surface features disposed on the top surface are parallel to the micro-scale surface features disposed on the bottom surface,
if the micro-scale surface features are disposed on the first surface and the second surface, the micro-scale surface features disposed on the first surface are parallel to the micro-scale surface features disposed on the second surface, or
if the micro-scale surface features are disposed on the top surface, the bottom surface, the first surface, and the second surface, the micro-scale surface features disposed on the top surface are parallel to the micro-scale surface features disposed on the bottom surface and/or the micro-scale surface features disposed on the first surface are parallel to the micro-scale surface features disposed on the second surface;
forming ribs;
assembling the top sheet, bottom sheet, and ribs into a multiwall panel, wherein the ribs are disposed between the bottom surface and the first surface; and,
wherein the micro-scale surface features are formed by a process selected from the group consisting of injection molding processes, solvent-assisted micro-molding processes, micro-transfer processes, molten polymer deposition processes, replica molding processes, lithographic processes, a self-assembly processes, laser engraving processes, and combinations comprising at least one of the foregoing processes.

13. The multiwall panel of claim 12, wherein the micro-scale surface features have an internal angle of 90 to 150 degrees.

14. The multiwall panel of claim 12, wherein the micro-scale surface features are disposed on the top surface, the bottom surface, the first surface, and the second surface.

15. A naturally lit structure, comprising:
a roof;
a structure capable of supporting the roof; and,
multiwall panels disposed on the roof, wherein the multiwall panels comprise a top sheet comprising a top surface and a bottom surface, a bottom sheet comprising a first surface and a second surface, and a rib disposed between the bottom surface and the first surface, wherein micro-scale surface features are disposed on the top surface and the bottom surface and/or on the first surface and the second surface;
wherein
if the micro-scale surface features are disposed on the top surface and the bottom surface, the micro-scale surface features disposed on the top surface are parallel to the micro-scale surface features disposed on the bottom surface,
if the micro-scale surface features are disposed on the first surface and the second surface, the micro-scale surface features disposed on the first surface are parallel to the micro-scale surface features disposed on the second surface, or
if the micro-scale surface features are disposed on the top surface, the bottom surface, the first surface, and the second surface, the micro-scale surface features disposed on the top surface are parallel to the micro-scale surface features disposed on the bottom surface and/or the micro-scale surface features disposed on the first surface are parallel to the micro-scale surface features disposed on the second surface.

16. The multiwall panel of claim 15, wherein the micro-scale surface features have an internal angle of 90 to 150 degrees.

17. The multiwall panel of claim 15, wherein the micro-scale surface features are disposed on the top surface, the bottom surface, the first surface, and the second surface.

18. A multiwall panel, comprising:
a top sheet comprising a top surface and a bottom surface;
a bottom sheet comprising a first surface and a second surface;
a rib disposed between the bottom surface and the first surface;
wherein micro-scale surface features are disposed on the top surface and the bottom surface and/or on the first surface and the second surface;
wherein
if the micro-scale surface features are disposed on the top surface and the bottom surface, the top surface micro-scale surface features have a top surface internal angle and the micro-scale surface features disposed on the bottom surface have a bottom surface internal angle, and wherein the top surface internal angle and the bottom surface internal angle are equal,
if the micro-scale surface features are disposed on the first surface and the second surface, the first surface micro-scale surface features have a first surface internal angle and the micro-scale surface features disposed on the second surface have a second surface internal angle, and wherein the first surface internal angle and the second surface internal angle are equal, or
if the micro-scale surface features are disposed on the top surface, the bottom surface, the first surface, and the second surface, the top surface micro-scale surface features have a top surface internal angle, the micro-scale surface features disposed on the bottom surface have a bottom surface internal angle, the first surface micro-scale surface features have a first surface internal angle, and the micro-scale surface features disposed on the second surface have a second surface internal angle, and wherein the top surface internal angle and the bottom surface internal angle are equal and/or the first surface internal angle and the second surface internal angle are equal.

19. The multiwall panel of claim 18, wherein the internal angle is 90 to 150 degrees.

20. The multiwall panel of claim 18, wherein the multiwall panel comprises an average light transmission of greater than or equal to about 70% as measured by ASTM D-1003-00, wherein the light transmission is measured from incidence angles from about −80° to about 80° in about 10° increments.

* * * * *